United States Patent Office 3,295,951
Patented Jan. 3, 1967

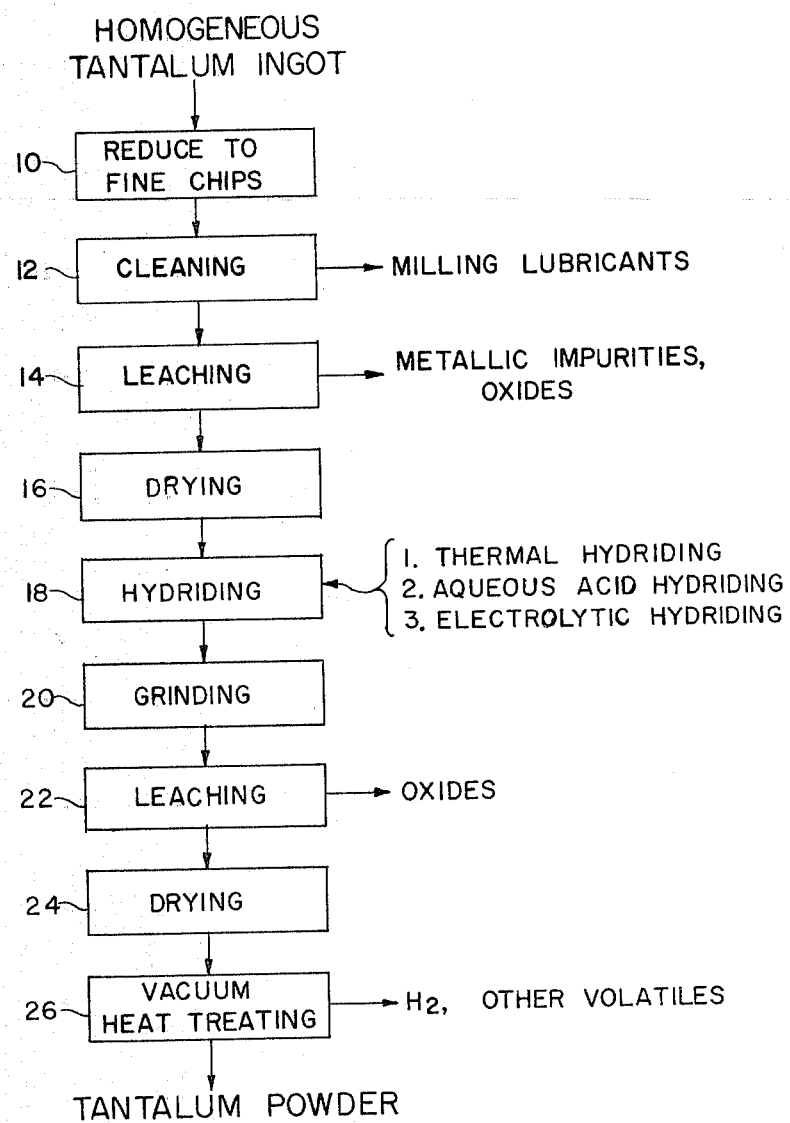

3,295,951
PRODUCTION OF METALS
Christopher J. B. Fincham, Boston, and Gerard J. Villani, Newton, Mass., assignors to National Research Corporation, Cambridge, Mass., a corporation of Massachusetts
Filed Feb. 2, 1965, Ser. No. 429,852
1 Claim. (Cl. 75—.5)

This invention relates to the production of metals and more particularly to the production of tantalum powder.

This application is in part a continuation of our copending application, Serial No. 293,748, filed July 9, 1963, now abandoned.

It is a principal object of this invention to provide a new tantalum powder useful in the production of sintered anode tantalum capacitors.

Another object of the present invention is to provide a new tantalum powder which is useful for the production of a porous tantalum capacitor anode of high capacitance, low leakage and high reliability.

Another object of the present invention is to provide a new tantalum powder which can be made into anodes which can be anodized at a high formation voltage and which provide a high breakdown voltage.

Another object of the present invention is to provide a new porous tantalum capacitor anode for liquid and solid electrolytic capacitors.

Still another object of the invention is to provide a process of producing such new tantalum powder.

Other objects of the invention will in part be obvious and will in part appear hereinafter.

The present invention accordingly comprises the product possessing the features properties, and the relation of components which are exemplified in the following detailed disclosure, and the scope of the application which will be indicated in the claim.

For a fuller understanding of the nature and objects of the invention, reference should be had to the following detailed description taken in connection with the accompanying drawing which is a flow sheet showing a preferred process embodying the present invention.

In accordance with the present invention, there is provided a new and improved tantalum powder useful in the production of sintered anodes for electrical capacitors. The tantalum powder of the present invention is characterized by its distinct form and composition whereby improved D.C. leakage and reliability are provided together with a high capacitance and high breakdown voltage of the sintered anode.

The general and current practice in preparing anodes has been guided by the concepts that the electrical characteristics of porous anode tantalum capacitors are highly dependent on the purity and surface area of the tantalum anode. Accordingly, considerable work has been directed toward preparing tantalum anodes having minimum total impurity levels and optimum surface area. For example, in accordance with presently known methods, some purification of the tantalum powder is obtained during the process of manufacturing the anode. During the anode sintering step some improvement in D.C. leakage and reliability can be achieved by increasing both the sintering time and temperature in order to distill off impurities. However, the capacitance decreases and the equivalent series resistance increases with increasing sintering times and temperatures of the anode. Thus, in order to obtain optimum electrical properties in accordance with presently known methods, it has been necessary to sinter the anode under conditions which represent a balance between those conditions leading to impurity removal and those resulting in excessive shrinkage of the anode. As a result, optimum electrical properties heretofore have been limited by the impurity level of the powder which is determined by the minimum practicable sintering condition.

In accordance with the present invention there is provided a tantalum powder whose impurity content is in solid solution with the exception of oxygen which may be present partly as a surface oxide film. Accordingly, all impurities and/or compounds of tantalum other than oxides are not present in the tantalum powder either as discrete particles or as a precipitated phase. It has been discovered in accordance with the present invention that a tantalum powder whose impurity content is in solid solution provides advantages which are not obtainable with presently known powders. For example, it has been found that a tantalum powder whose impurity content is in solid solution can tolerate or accommodate higher impurity levels without affect to the D.C. leakage or reliability of the porous sintered anode produced therefrom. This feature is of advantage in that less stringent sintering times or temperatures are required during the anode sintering step. Since capacitance decreases with increasing sintering times and temperatures, higher capacitance is obtainable.

Equally important is the feature that the tantalum powder whose impurity content is in solid solution can be anodized at a high formation voltage to provide a uniform, smooth, continuous dielectric oxide film. The uniform dielectric oxide film is important when it is considered that the leakage current is the current that flows through imperfections or discontinuities in the dielectric oxide film when a voltage is applied. This leakage current is believed to be due primarily to the presence of impurities or impurity centers which remain in the tantalum surface and prevent or disrupt oxide film formation at that point and thus prevent a continuous dielectric film from forming. The resultant imperfections in the dielectric oxide film thus increase the leakage current values. The tantalum powders of the present invention can be used to make anodes which can be anodized to high voltages and which have low leakage currents. As a result, capacitors of higher voltage ratings and higher reliability can be made as compared with capacitors made from previously known powders.

Additionally, the tantalum powder particles of the present invention are chunky, substantially non-porous, solid particles. It has been found that the difficulty of forming a continuous dielectric oxide film which is encountered with high porosity particles is substantially reduced or eliminated with the tantalum particles of the present invention. It is believed that the solid, non-porous configuration does not provide excessive small pores when pressed and sintered which would prevent entrance of the anodizing solution. Excessive small pores which are not anodized in high porosity particles result in leakage centers.

In accordance with a preferred embodiment of the present invention, the tantalum metal is first treated to provide a homogeneous tantalum metal so that any impurities present are in solid solution.

In one preferred embodiment, the tantalum metal is heated to an elevated temperature in an inert atmosphere for a sufficiently long time to dissolve the impurities in the tantalum metal.

In another embodiment of the present invention the tantalum metal can be electron beam melted or arc melted to provide a homogeneous tantalum metal whose impurity content is essentially all in solid solution. The homogeneous tantalum metal is then converted to tantalum powder. The conversion to powder is carried out so as to prevent addition of impurities.

The various steps of a preferred embodiment for converting the homogeneous tantalum metal to powder are shown diagrammatically in the drawing. In the first step 10 a tantalum metal ingot whose impurity content is in solid solution is machined in a conventional lathe or milling machine to reduce the tantalum ingot to turnings or other forms of chips or particles. The ingot is preferably milled into thin chips. Thin chips are easily hydrided since more complete diffusion of hydrogen can be accomplished with less hydriding time. The tantalum chips are then cleaned, step 12, to remove lubricants which may be used during the milling process.

The chips are preferably cleansed of the lubricants by using an organic solvent such as trichloroethylene following which treatment the tantalum chips are boiled in water.

In the next step 14 of the process the tantalum chips are leached with an acid solution such as agua regia or hydrochloric-hydrogen peroxide to remove metallic impurities such as iron, nickel and the like which may be picked up during the milling operation. These discrete impurities disrupt or prevent the formation of a continuous dielectric oxide film. Subsequent to this treatment, the tantalum chips are preferably rinsed and treated with an HF solution for about 1 hour to remove oxides from the surface of the tantalum. The HF solution preferably consists of about 1% HF and 2% $H_2O_2$. The tantalum chips are then rinsed with a fresh HF solution followed by an aqueous rinse and then dried, step 16.

The dried tantalum metal chips are then subjected to a hydriding step 18. In one preferred embodiment of the invention, the hydriding step is a thermal hydriding process and is carried out in the following manner:

The tantalum chips are heated to about 700° C. in a vacuum chamber at a pressure of about 1 micron Hg abs. The chamber is then filled to about 1 atmosphere with high purity hydrogen. The tantalum chips are then slowly cooled to about 300° C. to 400° C. During this cooling about 2000 to 4000 p.p.m. of hydrogen is absorbed by the tantalum chips to provide hydrided tantalum metal chips.

In the next step 20 the hydrided tantalum chips are ground to a powder in a ball mill. The ball mill and balls are preferably constructed of tantalum metal to prevent contamination of the hydrided tantalum chips during the grinding operation.

The tantalum chips are preferably ground in the presence of a liquid such as water. While water is preferred in the ball mill other liquids such as methanol and the like are also suitable. The final particle size of the ground powder, for given ball mill conditions, depends upon the hydrogen content of the chips, the size of the chips and grinding time.

In one preferred embodiment of the process, the hydrided tantalum powder is leached in a solution of HF which is preferably an HF–$H_2O_2$ solution to remove oxygen which may have been picked up during the ball-milling operation. The HF–$H_2O_2$ solution preferably consists of 1% HF and 2% $H_2O_2$.

The hydrided tantalum powder is then placed in a vacuum chamber and dried, step 24, at a temperature on the order of 70° C. and at a pressure of about 10 to 100 microns Hg abs. for approximately four hours.

In the final step 26 of the process adsorbed gases and hydrogen are removed from the hydrided tantalum powder. In this step the powder is heated to a temperature of between 150° C. and 300° C. at a pressure of about 0.1 to 1 micron Hg abs. for about 1 hour. The temperature of the tantalum powder is then raised to about 600° C.–700° C. while maintaining a pressure below 1 mm. Hg abs., and held at this temperature for ½ to 2 hours. In this manner, adsorbed gases and hydrogen are substantially completely removed.

In another embodiment of the invention the hydriding of the tantalum metal chips is accomplished by leaching the tantalum chips in an aqueous acid solution. The aqueous acid solution preferably consists of a 5% HF solution. In this manner as much as 3000 p.p.m. of hydrogen is absorbed by the tantalum chips within a period of about 16 hours. However, the metal loss due to solution is on the order of 10 to 15% and for this reason hydriding by the aqueous acid leach is less preferred than the thermal hydriding process.

In still another embodiment of the invention, the hydriding of the tantalum metal chips is accomplished by electrolytic hydriding using an electrolyte such as diluted sulfuric acid. This process is of advantage over the aqueous acid hydriding in that it can be carried out without metal loss. Both the aqueous acid and the electrolytic hydriding are less preferred however since they are more restricted in respect to the thickness of the tantalum chips to be hydrided. Since these processes are carried out at room temperature, the rate of diffusion of hydrogen is less and substantially thinner chips must be used than required for thermal hydriding.

The tantalum chips hydrided according to the above embodiments are rinsed and dried in the same manner as the thermally hydrided chips. The steps (20, 22, 24, 26) subsequent to the hydriding step are carried out in the same manner as described above.

The invention will now be described by way of specific non-limiting examples.

EXAMPLE 1

In this example the starting material was a vacuum arc-melted tantalum ingot. The tantalum ingot was treated according to the above-described process, the tantalum chips being hydrided thermally. The tantalum powder so produced had a purity equal to the starting ingot material with the exception of oxygen which was higher due to surface oxidation. The tantalum powder had the following chemical analysis in p.p.m.:

| | | | |
|---|---|---|---|
| O | 993 | Cr | <5 |
| H | 13 | Cu | <1 |
| N | 48 | Mg | <1 |
| C | 20 | Mn | <1 |
| W | <40 | Mo | <10 |
| Si | 35 | Na | <5 |
| Fe | 8 | Sn | <1 |
| Ni | <5 | Ti | <5 |
| Al | <25 | Co | <5 |
| Ca | <1 | Nb | <25 |

The tantalum powder was then tested for impurity segregation. Two grams of the tantalum powder were pressed to a density of about 14 g./cc. to form a coherent cylindrical pellet ¼ inch in diameter. The pellet was mounted in Laminac, cross-sectioned, polished, and formed to 100 v. for 30 minutes at room temperature in 0.01% $H_3PO_4$ solution to give a characteristic blue film. The resulting oxide film on the tantalum particles was uniform in color and continuous. This test which shall be referred to in the specification and claim as the "standard impurity test" showed that the impurities in the tantalum powder were in solid solution. When impurities are present either as discrete particles or as a precipitated phase and not in solid solution, they appear as a different color and/or as a pitted area in the oxide film when subjected to the "standard impurity test."

The particle shape number of the tantalum powder particles was then determined as discussed hereinafter. By the term "particle shape number" it is meant the ratio of the Roller sub-sieve sizer particle diameter to the Fisher sub-sieve sizer particle diameter.

For a detailed description of the Roller method see: P. S. Roller, Size Distribution of Ceramic Powders as Determined by a Particle Size Air Analyzer, Journal of American Chemical Society, vol. 20, No. 5, May 1937.

For a detailed description of the Fisher method see: Gooden, Ernest L., and Smith, Charles M., Ind. Eng. Chem. Anal., Ed. 12, 479–482 (1940).

The ratio of the two diameters is a measure of deviation from a perfect sphere, since Roller is a measure of the apparent diameter while Fisher is a measure of the specific surface the Fisher measurement being converted into average particle diameter. For a sphere, the ratio of the two (Roller and Fisher) diameters would be unity. If the particles were porous, the Fisher apparatus would report a higher specific surface (or lower particle diameter) and the particle shape number would increase as it does in Examples 4 and 5 (infra). Photomicrographs of these powders show more porosity, i.e., the particles have internal pores. There are at least three general methods for determining surface area and particle size from which one can calculate the shape factor: (a) gas adsorption, (b) air permeability, and (c) particle sedimentation. Gas adsorption methods are based on the BET equations and they rely on an adsorbed monolayer of gas throughout the exposed surface of a particle. This method is best for accurate surface area measurements. Air permeability measurements are based on the Kozeny-Carmen equation which relates the specific surface area to the flow rate of a gas through a powder bed. The Fisher subsieve sizer utilizes this principle, but converts the specific area into an average particle diameter. It is fast but not as accurate as the BET method. However, the BET method is tedious and costly and becomes inaccurate with powders of moderately low specific surface area. Particle sedimentation methods (such as the Roller method) are based on Stokes' law which relates the rate of a falling body to its diameter. It is used primarily for size determination as opposed to surface area.

For a 15–20 micron fraction of tantalum powder as prepared in Example 1, the particle shape number was 1.25 since the Roller value was 17.5 and the Fisher value was 14.0. The tantalum powder particles so prepared were chunky, substantially non-porous, solid particles as shown by photomicrographs and the small deviation from unity of the particle shape number.

The tantalum powder prepared in Example 1 was then made into tantalum anodes to test for reliability, D.C. leakage, capacitance, ESR, and breakdown voltage. 1.8 grams of tantalum powder having an average particle diameter of about 9.4 microns was pressed to form a coherent cylindrical pellet ¼ inch in diameter having a density of 9.5 g./cc. The tantalum pellets were then sintered in a vacuum sintering furnace for a period of 1.5 hours at a pressure of about 0.1 micron Hg abs. and at a temperature of about 1930° C. Next an oxide film, having dielectric properties (referred in the specification and claim as "dielectric oxide film"), was formed on the sintered pellets. This was done by anodic oxidation of the pellet in a 0.01% phosphoric acid solution at 90±2° C. at an approximate constant current density of 35 milliamps per gram of pellet weight until the desired voltage of 200 was reached and then held until the current decayed to 12 microamps per gram. Formation was then continued to 270 volts at this new current and held for 1 hour. The anode was then rinsed for 30 minutes in distilled water and dried. The electrical characteristics of the anodized pellet are reported in the table. The standard conditions of measurements of D.C. leakage, capacitance and ESR (referred to in the specification and claim as "standard conditions"), were done using 10% phosphoric acid at room temperature as electrolyte and a cylindrical platinized silver cathode 1.5 inches in diameter and 2 inches in height. D.C. leakage was measured after 2 minutes at 140 volts and capacitance and ESR were measured at 120 cycles per second with a 0.5 volt A.C. signal. An impedance bridge (for example, Type 1650-A, General Radio Company) was used to measure the dissipation factor (D) and capacitance (C); and the ESR was calculated using the relationship $$ESR = \frac{D}{2\pi FC}$$

where C is the capacitance (in farads), F is the frequency of the A.C. signal (in cycles/second), and ESR is given in ohms.

The "standard conditions" for determining breakdown voltage consisted of applying a 500 volt potential through a 3300 ohm resistor to the anode in an electrolytic cell containing 1% $H_3PO_4$ at 92° C. As anodization proceeds, a potential is reached where the resistance of the anodic film decreases sharply. This is called the breakdown voltage, and is characterized by a sudden current surge, accompanied by gas evolution and a voltage drop across the anodic film of the anode. The results of the electrical tests are reported in the table.

EXAMPLE 2

In this example, an arc-melted tantalum ingot was used, having the following analysis in p.p.m.:

| | | | |
|---|---|---|---|
| O | 34 | Al | <25 |
| N | 29 | Cr | <5 |
| C | 16 | Cu | <1 |
| W | <40 | Mn | <10 |
| Si | 22 | Nb | 25 |
| Fe | 8 | Ti | <5 |
| Ni | 9 | | |

The ingot was grooved and sufficient Fe, Ni, Si and W powder added to provide 160 p.p.m. Ni, 170 p.p.m. Fe, 390 p.p.m. Si, and 292 p.p.m. W. The groove was then closed with tantalum metal and the ingot vacuum arc-melted to dissolve the added impurities. The ingot produced was converted to tantalum powder as in Example 1. The powder when subjected to the "standard impurity test" was found to have all its impurity content in solid solution. The oxide film was uniform and continuous like that of Example 1 even though the impurity levels of Fe, Ni, Si and W were substantially greater. The electrical test results on anodes of this powder having an average particle diameter of about 12.5 microns are reported in the table.

EXAMPLE 3

In this example the tantalum powder was prepared as in Example 1 using a vacuum arc-melted tantalum ingot. The tantalum powder had the following chemical analysis in p.p.m.:

| | | | |
|---|---|---|---|
| O | 785 | Cr | <5 |
| H | 9 | Cu | <1 |
| N | 20 | Mg | <1 |
| C | 21 | Mn | <10 |
| W | <40 | Mo | <10 |
| Si | 2 | Nb | <25 |
| Fe | <5 | Sn | <5 |
| Ni | <5 | Ti | <10 |
| Al | <25 | Co | <5 |

100 p.p.m. of W powder having a particle size of about 100 mesh was thoroughly mixed with the tantalum powder. The powder mixture was then subjected to the "standard impurity test" in accordance with Example 1. The oxide film was not uniform as to color or continuity. The W particles which were present as discrete impurities stood out as light pitted areas, red, yellow and green in color, surrounded by the characteristic blue film of the tantalum metal. The results of the electrical tests on anodes of this powder having an average particle diameter of about 11.9 microns are reported in the table. All anodes failed to anodize to 270 volts.

EXAMPLE 4

In this example tantalum powder was produced in accordance with the process disclosed in U.S. Patent 2,950,185, granted to Hellier and Martin, August 23, 1960. The tantalum powder produced had the following chemical analysis in p.p.m.:

| | | | |
|---|---|---|---|
| O | 574 | Cr | 13 |
| H | 58 | Cu | <1 |
| N | 42 | Mg | 2 |
| C | 19 | Mn | <5 |
| W | <40 | Mo | <10 |
| Si | 110 | Nb | 67 |
| Fe | 55 | Sn | 8 |
| Ni | 57 | Ti | <10 |
| Al | <25 | Co | <5 |
| Ca | 97 | Na | 67 |

This tantalum powder had a particle shape number of 1.99 as determined on a 15–20 micron fraction. The Roller value was 17.5 and the Fisher value was 8.8. The tantalum powder when subjected to the "standard impurity test" had an oxide film which was nonuniform and pitted as a result of impurity centers. The results of electrical tests on this powder which had an average particle diameter of about 9.6 microns are reported in the table. Two of the three anodes tested failed to anodize to 270 volts.

EXAMPLE 5

In this example a commercially available capacitor grade tantalum powder was used. The tantalum powder had the following chemical analysis in p.p.m.:

| | | | |
|---|---|---|---|
| O | 900 | Al | 50 |
| H | 50 | Cr | 10 |
| N | 750 | Ca | 50 |
| C | 120 | Ti | 40 |
| Si | 780 | Mo | 25 |
| Fe | 460 | Nb | 140 |
| Ni | 25 | | |

This tantalum powder had a particle shape number of 2.36 as determined on a 15–20 micron fraction. The Roller value was 17.5 and the Fisher value was 7.4. The tantalum powder when subjected to the "standard impurity test" had an oxide film which was nonuniform and pitted as a result of impurity centers. The results of electrical tests on anodes of this powder having an average particle diameter of about 6.4 microns are reported in the table. All anodes failed to anodize to 270 volts.

EXAMPLE 6

In this example a portion of the tantalum powder of Example 3 was used. To this powder 63 p.p.m. of nitrogen as TaN was added and thoroughly mixed. The powder mixture was then tested and found to be segregated with respect to the impurity content. The results of the electrical tests on anodes of this powder are reported in the table. All anodes failed to anodize to 270 volts.

EXAMPLE 7

In this example the tantalum powder used was prepared as in Example 4. The tantalum powder had the following chemical analysis in p.p.m.:

| | | | |
|---|---|---|---|
| O | 660 | Cr | 7 |
| N | 28 | Cu | <1 |
| C | 27 | Mg | <1 |
| W | <40 | Mn | <1 |
| Si | 270 | Mo | <10 |
| Fe | 35 | Nb | 50 |
| Ni | 97 | Sn | 3 |
| Al | <25 | Ti | <5 |
| Ca | <50 | Co | <5 |

To this powder 188 p.p.m. of nitrogen as TaN was added and thoroughly mixed. The powder was melted to dissolve the impurities and then converted to tantalum powder. The powder had the following chemical analysis in p.p.m.:

| | | | |
|---|---|---|---|
| O | 1340 | Cr | 2 |
| N | 210 | Cu | <1 |
| C | 31 | Mg | <5 |
| W | <40 | Mn | <1 |
| Si | 250 | Mo | <10 |
| Fe | 48 | Nb | 110 |
| Ni | 80 | Sn | <1 |
| Al | <10 | Ti | <5 |
| Ca | <25 | Co | <5 |

The powder was tested and found to have all its impurity content in solid solution. The results of electrical tests on anodes of this powder having an average particle diameter of about 10.6 microns are reported in the table.

Table
ELECTRICAL PROPERTIES

| Example | 1 | 2 | 3 | 4 | 5 | 6 | 7 |
|---|---|---|---|---|---|---|---|
| Solid solution | (1) | (1) | (2) | (2) | (2) | (2) | (1) |
| Failures out of 3 | 0/3 | 0/3 | 3/3 | 2/3 | 3/3 | 3/3 | 0/3 |
| Leakage microamperes, per gram | 1.19 | 1.84 | | 2.19 | | | 2.01 |
| Capacitance microfarads, per gram | 7.0 | 6.8 | | 7.3 | | | 6.9 |
| ESR, ohms | 8.8 | 5.5 | | 9.6 | | | 12.6 |
| Breakdown voltage | 320 | 264 | 156 | 190 | 195 | 204 | 282 |
| P.p.m. in powder: | | | | | | | |
| Fe | 8 | 170 | <5 | 55 | 460 | <5 | 48 |
| Ni | <5 | 160 | <5 | 57 | 25 | <5 | 80 |
| Si | 35 | 390 | 2 | 110 | 780 | 2 | 250 |
| W | <40 | 292 | 100–140 | <40 | | <40 | <40 |
| N | 48 | 20 | 20 | 42 | 750 | 88 | 210 |
| C | 20 | 16 | 21 | 19 | 120 | 21 | 27 |

[1] Yes.
[2] No.

Referring now to the table, it can be seen that the present invention provides a new and improved tantalum powder for use in making tantalum capacitors. Examples 1, 2 and 7, illustrative of the present invention, provide for a high capacitance together with a low leakage, high reliability, low ESR and high breakdown voltage. The tantalum powder of Example 2 was able to accommodate substantial impurity levels of Fe, Ni, Si and W, for example, and still provide improved electrical properties. Similarly, Example 7 was able to accommodate substantial nitrogen content. Additionally, Examples 1 and 2 had no anode failures and a high breakdown voltage. In contrast, anodes of Examples 3, 5 and 6 all failed to anodize to 270 volts. Two out of three anodes of Example 4 failed to anodize to 270 volts.

Since certain changes may be made in the above product without departing from the scope of the invention herein involved, it is intended that all matter contained in the above description, or shown in the accompanying drawing, shall be interpreted as illustrative and not in a limiting sense.

What is claimed is:
As an article of manufacture, a tantalum powder useful in the production of tantalum capacitors, said tantalum powder consisting of tantalum particles having a solid chunky appearance as determined by photomicrograph and a 15–20 micron fraction of said tantalum powder having a particle shape number of less than 1.5 as determined by the ratio of "Roller" to "Fisher" particle diameters, said tantalum particles having at least 10 p.p.m. of at least three of the following impurities: iron, nickel, silicon, tungsten, nitrogen and carbon, all of said impurity content being in solid solution, whereby a sintered anode made from said powder particles and sintered at a temperature of about 1930° C. for about 1.5 hours can be anodized to form a uniform continuous dielectric oxide film which will have a breakdown voltage in excess of 260 volts when measured under "standard conditions."

References Cited by the Examiner

UNITED STATES PATENTS

| | | | |
|---|---|---|---|
| 2,950,185 | 8/1960 | Hellier et al. | 75—0.5 |
| 3,048,484 | 8/1962 | Downing et al. | 75—84 |
| 3,114,629 | 12/1963 | Downing et al. | 75—84 |

FOREIGN PATENTS

| | | |
|---|---|---|
| 1,305,227 | 11/1961 | France. |
| 746,061 | 3/1956 | Great Britain. |

OTHER REFERENCES

Hall et al.: Article in Electrical Manufacturing, volume 46, Issue 6, pages 82–85, December 1950.

Houtz et al.: Properties of Tantalum Related to Performance of Solid Electrolytic Capacitors, Bell Telephone System Technical Publications (Monograph 3305).

DAVID L. RECK, *Primary Examiner.*

N. F. MARKVA, *Assistant Examiner.*